INVENTORS.
JACK D. ZEFF
ROBERT A. BAMBENEK
CYRIL M. TOMSIC
BY
Lawrence S. Epstein
ATTORNEY

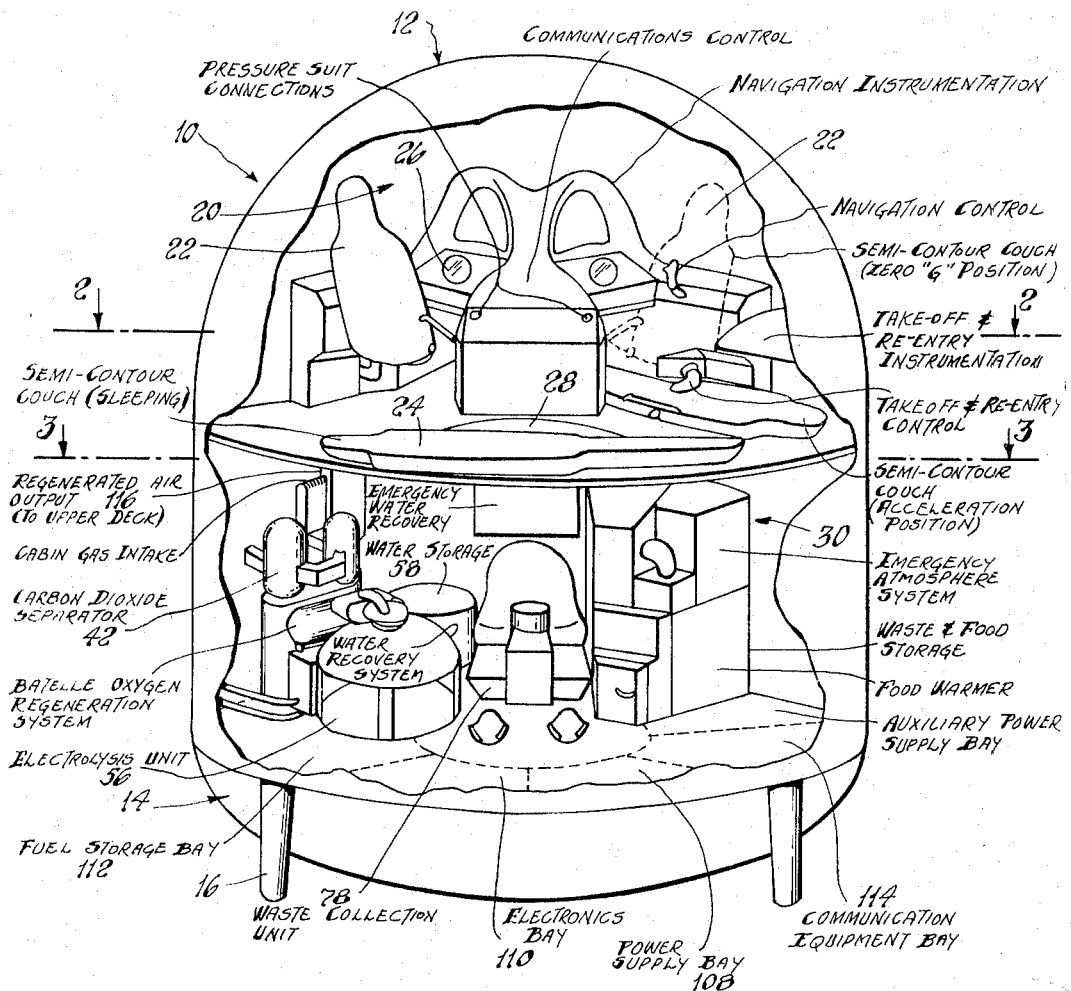

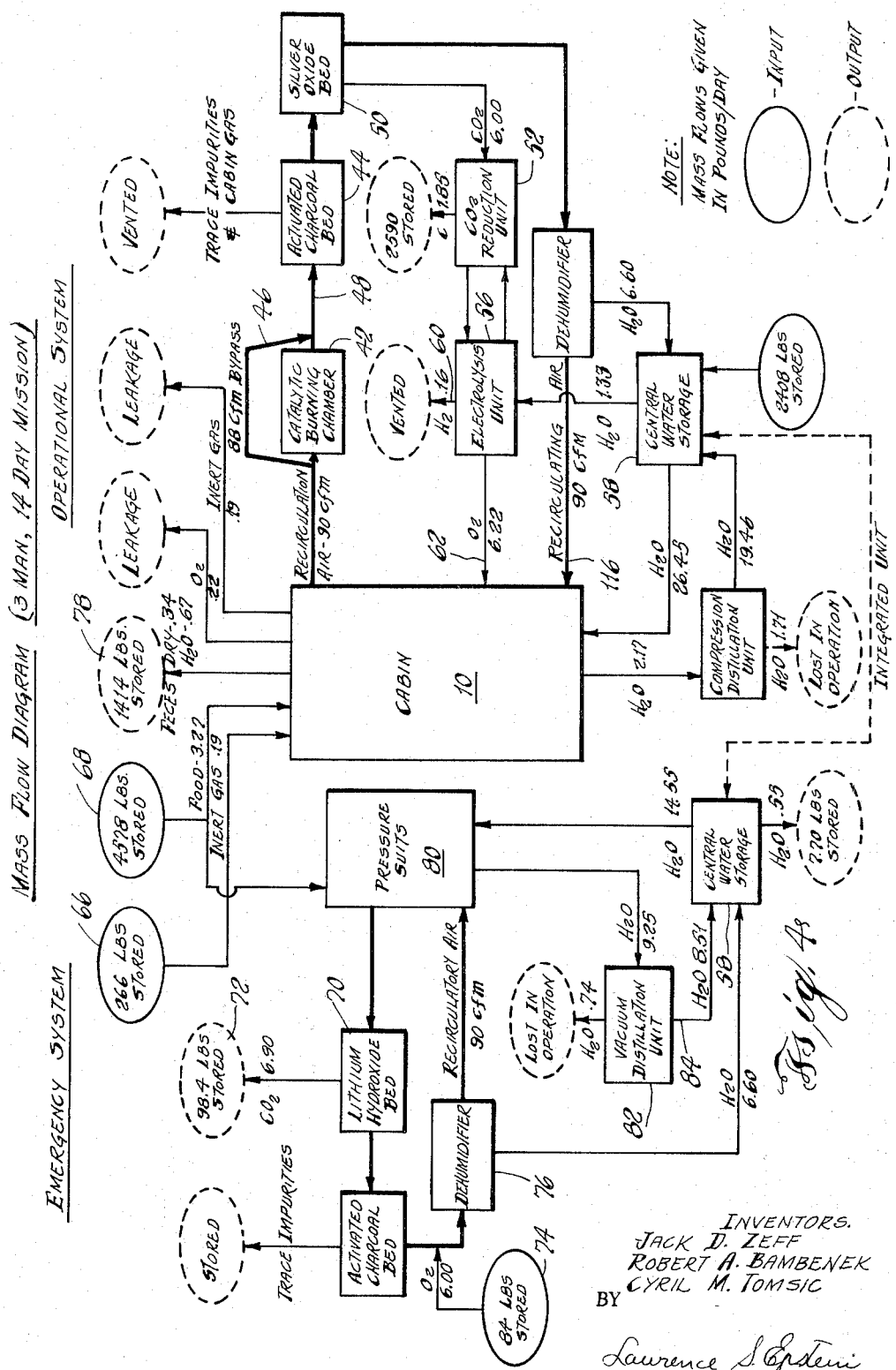

INVENTORS.
JACK D. ZEFF
ROBERT A. BAMBENEK
CYRIL M. TOMSIC

United States Patent Office 3,295,223
Patented Jan. 3, 1967

3,295,223
CLOSED ENVIRONMENTAL SIMULATOR FOR THREE MEN
Jack D. Zeff, Highland Park, Robert A. Bambenek, Glenview, and Cyril M. Tomsic, Chicago, Ill., assignors, by mesne assignments, to the United States of America as represented by the Secretary of the Navy
Filed Jan. 23, 1964, Ser. No. 339,824
6 Claims. (Cl. 35—12)

This invention relates to an environmental simulator and is particularly adapted to sustain a three man crew in self-supporting condition.

As man attempts to conquer space, the need for training of the crews is apparent. Since such travel would be precarious as space vehicles are developed, training under environmental conditions would materially enhance chances for survival. Task trainers, which provide only the indicators and controls of the environmental system are undesirable, since the trainee is not exposed to a variable environment. This is also true for reaction trainers, which utilize externally controlled environment while the trainee is encapsulated. The provision of a qualification trainer, which supplies a complete and operable environmental system, which the trainees are required to operate for extended time periods, provides the best training. Maintenance and repair problems could also be introduced. The present invention encompasses the latter system.

It is an object of the invention to provide an environmental simulator capable of training a crew for space flight.

It is another object to design a simulator which compactly contains the units necessary for self-support of a space crew.

It is yet another object to train a space crew in closed environmental conditions normally encountered in space flight.

It is an object of the invention to provide a space training capsule which may have malfunctions introduced to accustom a crew to all types of environmental conditions.

Other objects and many of the attendant advantages of this invention will be readily appreciated as the same becomes better understood by reference to the following detailed description when considered in connection with the accompanying drawings wherein:

FIG. 1 is an elevation of a space training capsule, the interior thereof being exposed;

FIG. 4 is a mass flow schematic of a system providing complete self-support of a space crew.

Figure 3:
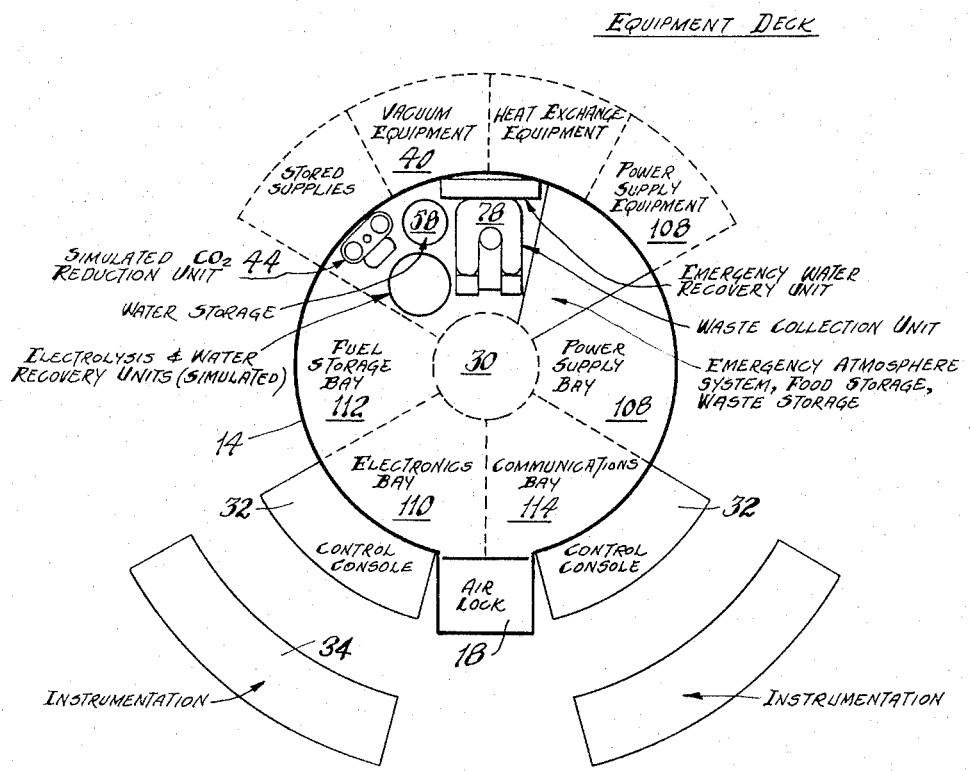
FIG. 3 is a plan view of the equipment deck and is taken on line 3—3 of FIG. 1.

To accommodate a three man crew, the free volume of a sealed cabin should be at least 300 cubic feet. Since the volume occupied by the equipment will be about 200 cubic feet, the minimum total internal volume should be approximately 500 cubic feet. For capsules of this size it is advisable to divide the volume into two compartments; one for the crew and the second compartment for equipment.

Advanced type space vehicles will utilize electrical propulsion for continual acceleration or deceleration. Under these conditions the attitude control system can orientate the vehicle so that weight forces objects towards the flow of the cabin. Under these sub-gravity conditions free items within the capsule will tend to stay in place of "fall" towards the floor.

When these design conditions are considered in conjunction with the aerodynamic shape of the capsule required for reentry, a cylindrical shaped capsule with two floors normal to the axis of the cylinder appears to be the best overall configuration. This shape was therefore selected for the recommended simulator.

FIG. 1 illustrates the preliminary configuration of the simulator shell 10, as well as the arrangement for the major subsystems of the enviornmental system. The shell is fabricated by welding a hemispherical head 12 and an elliptical head 14 to either end of an eight-foot-diameter cylinder. The support legs 16 are provided so that the shell can be placed in a vertical position. An air lock type entrance-way 18 is located in the cylindrical section 14 of the shell. The complete assembly is fabricated preferably from aluminum alloy and designed to withstand a pressure differential of 15 p.s.i.

Figure 2:
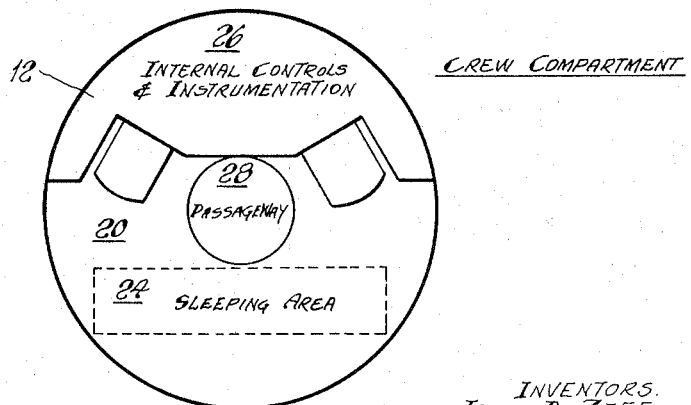
FIG. 2 is a plan view of the crew compartment, and is taken on line 2—2 of FIG. 1.

FIGS. 2 and 3 indicate the recommended arrangement for the internal and external equipment necessary to operate the simulator The internal equipment consists of operable life-support equipment, simulated advanced type life-support equipment, and mock-ups of non-environmental equipment required in advanced space vehicles.

The upper deck or crew compartment 20 contains the two operator positions 22 and the one sleeping area 24. The control panels 26 contain operable indicators and controls for the environmental system, in their required location with respect to mock-ups of other flight instrumentation. The passageway 28 to the lower deck can be sealed when the simulator is to be used as either a task or reaction trainer, or closed by the trainees during a simulated decompression or emergency condition.

The lower deck 30 contains the major subsystems of the environmental system, as well as mock-ups of other equipment necessary in a space vehicle. The occupants would enter this compartment to attend their sanitary needs, prepare food, and perform routine maintenance or emergency repairs. The air lock 18 is located in the wall of this compartment to facilitate entrance or exit of personnel during a test.

External equipment required are control consoles 32, indicating and recording instrumentation 34, closed circuit television 36 for surveillance of the trainees, and support equipment 38 which is located on the back side of the shell 10.

FIGURE 4 indicates the flow diagram for materials in the recommended environmental system. To simulate gas leakage from the capsule and control total internal pressure, the vacuum pumping equipment indicated at 40 in FIG. 3 is required.

To provide a normally operating cooling air flow for three men without excess temperature rise, an air recirculation rate of 90 c.f.m. from the cabin 10 is required. Only 2 c.f.m. need be passed through the catalytic combustion chamber 42 to remove the small fraction of trace impurities which are not removed by the activated charcoal bed 44. The remaining 88 c.f.m. of air is sent directly through the byline 46 to the conduit 48 where it mixes with the gases passing through the catalytic combustion chamber 42 for removal of trace impurities in the charcoal bed 44. The cleaned air passes through the silver oxide bed where 6.9 pounds of $CO_2$ is separated (average amount generated by three men in one day) from the air stream. (See patent application, Serial No. 339,826, filed January 23, 1964.) The $CO_2$ reduction system 52, converts the 6.9 lbs./day of $CO_2$ into 1.85 lbs./day of carbon which is stored at 54 and 5.67 lbs./day of water which is fed to the electrolysis unit 56. The electrolysis unit 56 receives an additional 1.33 lbs./day of water from the central water storage 58 and converts the total of 7 lbs./day into 0.78 lb./day of hydrogen 60 (of which 0.16 lb./day is vented), and 6.22 lbs./day of oxygen 62 which is supplied to the cabin 10 for breathing.

The 90 c.f.m. of air also passes through the dehumidifier 64 where 6.6 lbs./day of water are removed and supplied to the central water storage 58. The central water storage initially contains 24 pounds of water to allow for the inefficiency of the water recovery system which receives 21.17 lbs./day of waste water but produces only 19.46 lbs./day of potable water.

To allow for cabin leakage over 14 days, 2.66 lbs. of inert gas must be stored at 66. Also, 45.78 lbs. of food must be stored at 68 for 14 days' supply. Feces account for approximately 1.01 lb./day. The remainder of the food yields the carbon in the exhaled $CO_2$ and the excess of water output over water input to the human body.

In case of emergency, carbon dioxide is removed by absorption in the lithium hydroxide bed 70. In 14 days a total of 98.4 lbs. of $CO_2$ must be absorbed and stored at 72. To provide oxygen for 14 days a total of 84 lbs. of this gas must be stored at 74 and supplied to the pressure suits at a rate of 6 lbs./day.

The pressure suit circuit dehumidifier 76 supplies 6.6 lbs./day of water directly to central water storage 58. This is an integrated unit. Waste water in the amount of 9.25 lbs./day is fed from the pressure suit 80 to the vacuum distillation unit 82 and 8.51 lbs./day of potable water are recovered and sent to central water storage via the conduit 84. This water is then returned to the pressure suits 80.

Figure 5:
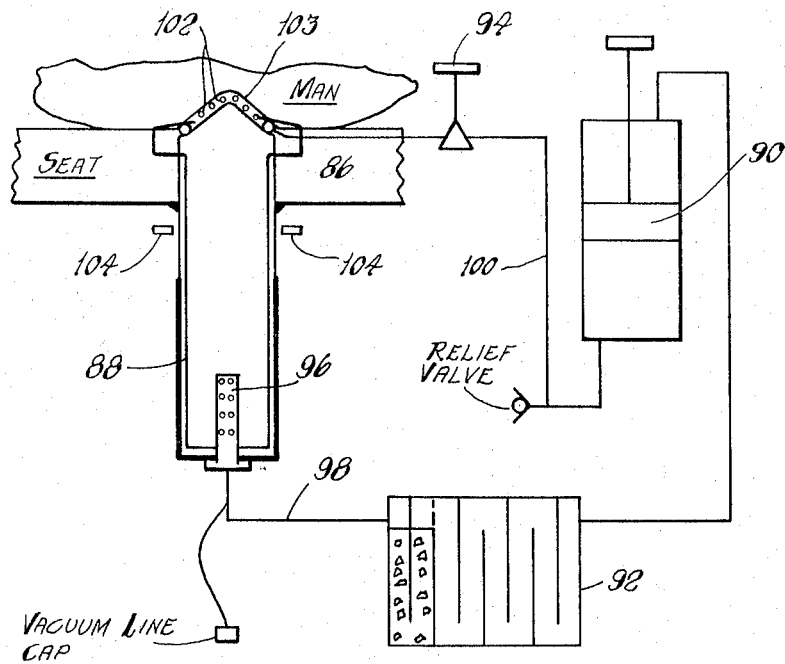
FIG. 5 is a schematic illustration of a waste collection system.

The waste collection unit 78 is described in greater detail in FIG. 5 and provides collection techniques designed to operate in the absence of gravity. The system determined optimum is of modular design.

To operate, the man straps himself to the seat positioning himself over the container 88 and operates the hand pump 90. A partial vacuum is created in the container which seals the perineum to the container form by exhausting the cabin gas to the cabin via the deodorizer 92. During elimination the pump 90 is operated as required to maintain the partial vacuum. When completed, the flushing valve 94 is opened and the hand pump 90 operated. Cabin gas and gases from the container 88 circulate through the tube 96, vacuum line 98, deodorizer 92, pump 90, pressure line 100, the form and back into the container 88. Pumping is continued until the odors have been removed and the jets of air from the small orifices 102 in the ring form 103 have forced the waste deep into the container.

The pinchers 104 are operated, squeezing the container and sealing the waste in the bottom. The waste paper is placed in the container 88. The ring 103 is removed from the container and the container top is closed with a spring clip. The vacuum line connection 98 to the container is broken and the line and container are capped. The container is removed from the metal form 106 seat and the seat is capped to complete the operation.

The remaining necessary units such as the power supply equipment 108, the electronics equipment 110, fuel supply 112, communcations equipment 114, regenerated air 116, water 58, etc. are arranged in the simulator in a compact and expeditious system.

Obviously many modifications and variations of the present invention are possible in the light of the above teachings. It is therefore to be understood that within the scope of the appended claims the invention may be practiced otherwise than as specifically described.

What is claimed is:
1. A self-contained environmental simulator comprising,
space navigation instrumentation and control equipment,
major subsystems and environmental systems,
a housing formed of a substantially cylindrical shell and upper and lower outwardly convexly shaped end closures,
upper and lower spaced decks dividing said housing into an upper compartment for retaining a crew to be trained and said instrumentation and control equipment,
a lower compartment for retaining and storing said major subsystems and environmental systems equipment, and a base compartment,
a passageway connecting said upper and lower compartments, and means for sealing said passageway when said simulator is to be used as either a task or reaction trainer or closed by the trainees during a simulated decompression or emergency condition.
2. The combination of claim 1, wherein said base compartment includes,
spaced radially directed walls dividing said base compartment into separate bays for various fuel and electrical supply equipment.
3. The combination of claim 1 wherein said instrumentation and control equipment includes,
pressure suits for use of a crew of trainees, and
means connecting said pressure suits to said equipment whereby realistic environmental conditions are provided,
communication means,
navigation information means, and
control means operatively connected to said communication means and to said navigation information means, whereby the crew trainee may manipulate the equipment.
4. The combination of claim 3 wherein said major subsystems include means to regenerate waste products are retained in said lower compartment, and
means, connecting said upper compartment with said regeneration means whereby purified waste products are returned to said housing for reuse by the crew being trained.
5. A simulator according to claim 1, said environmental system including a waste collection unit adapted to operate in the absence of gravity comprising,
an open chamber containing a seat,
a removable container retained in said chamber,
vacuum means operatively connected to said container and adapted to provide a partial vacuum to exhaust gases,
a deodorizer connected to said vacuum means whereby removed exhaust gases are deodorized, and
means returning deodorized gases to the container.
6. A simulator according to claim 5, wherein said seat includes a ring member,
a plurality of orifices in said ring member whereby jets of air force the waste deep into the container, and
means sealing said container prior to removal from the chamber.

References Cited by the Examiner
UNITED STATES PATENTS

| | | | |
|---|---|---|---|
| 1,818,586 | 8/1931 | Schumacher | 4—133 |
| 2,300,109 | 10/1942 | Dahlke | 4—112 |
| 2,671,906 | 3/1954 | Potts | 4—142 |
| 2,749,558 | 6/1956 | Lent et al. | 4—10 |
| 3,010,220 | 11/1961 | Schueller | 35—12 |
| 3,034,131 | 5/1962 | Lent | 128—144 |
| 3,064,364 | 11/1962 | Schueller | 35—12 |
| 3,083,473 | 4/1963 | Luton | 35—12 |
| 3,084,454 | 4/1963 | Schueller | 35—12 |
| 3,158,874 | 12/1963 | Bennett | 4—142 |
| 3,190,287 | 6/1965 | Miller | 128—144 |
| 3,209,468 | 10/1965 | Frisch | 35—12 |

EUGENE R. CAPOZIO, *Primary Examiner.*

S. M. BENDER, W. W. NIELSEN, *Assistant Examiners.*